Aug. 15, 1939.  N. F. ANDREWS  2,169,909
TRACTOR MOUNTED IMPLEMENT
Filed Feb. 14, 1938  2 Sheets-Sheet 2
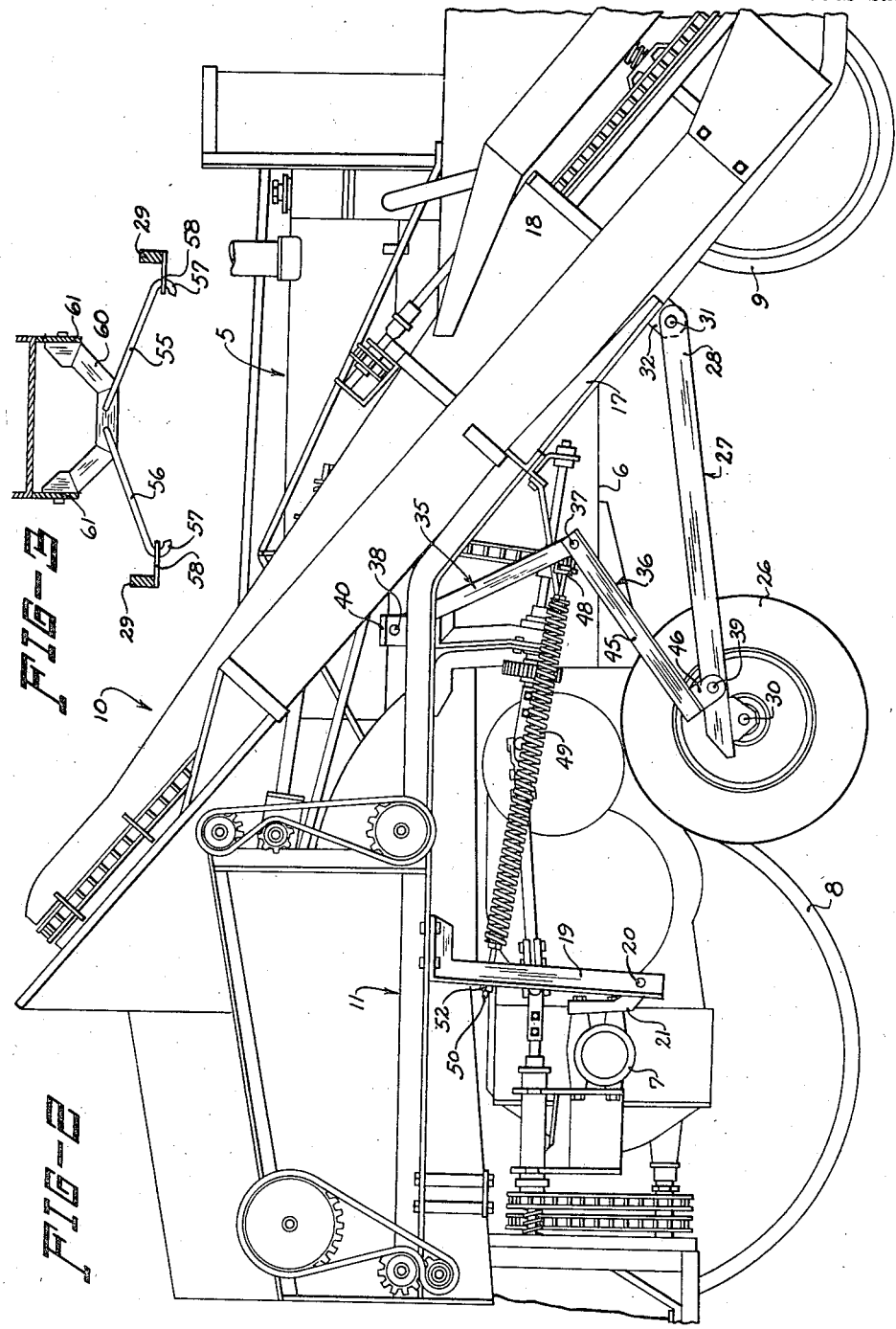
INVENTOR
Norman F. Andrews
ATTORNEYS Patented Aug. 15, 1939

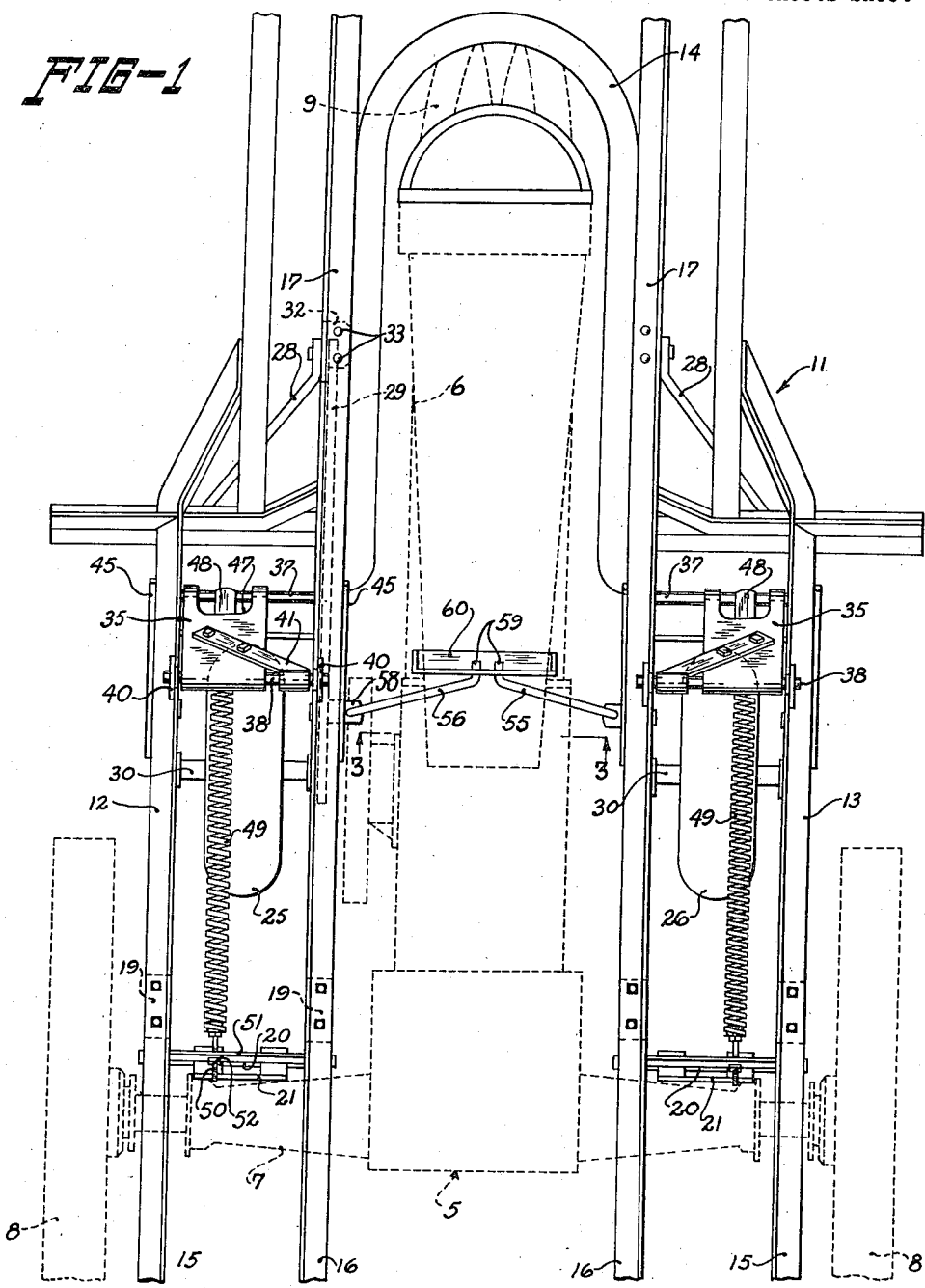

2,169,909

UNITED STATES PATENT OFFICE 2,169,909

TRACTOR MOUNTED IMPLEMENT

Norman F. Andrews, Moline, Ill., assignor to Deere & Company, Moline, Ill., a corporation of Illinois Application February 14, 1938, Serial No. 190,387

14 Claims. (Cl. 56—15)

My invention relates generally to tractor mounted implements, and more particularly to auxiliary supporting wheels for implements of the tractor mounted type, such as, for example, a tractor mounted corn picker as shown and described in an application by Alvin W. Oehler and Ralph L. Anderson, Serial No. 58,449, filed January 10, 1936, and also in an application by Wilbur J. Coultas, Serial No. 182,133, filed December 28, 1937.

Heretofore, the auxiliary supporting wheels for heavy tractor mounted implements have been disposed under the implement frame near the fore part of the tractor. In order to permit steering the tractor, with the implement mounted thereon, by means of the usual dirigible front wheel or wheels, it has been necessary to provide linkage mechanism between the auxiliary supporting wheels and the dirigible wheel of the tractor, whereby the auxiliary wheels could be guided coincidental to the manipulation of the tractor steering wheel.

The principal object of my invention therefore, has to do with the provision of improved and simplified mountings for the auxiliary supporting wheels and to eliminate the necessity for steering the latter. In the accomplishment of this object, I have found that by locating the auxiliary wheels toward the rear portion of the tractor near the rear axle housing and in overlapping relation to the rear traction wheels, the auxiliary wheels in such position, although maintained on axes parallel to that of the traction wheels, do not interfere unduly with the steering of the tractor, but permit the latter to be guided by means of the front dirigible wheels.

A further object relates to the provision of draft means for the auxiliary wheels by which the latter are pulled along the ground as the implement advances, instead of being pushed, thereby resulting in lighter, less expensive parts which are more responsive to uneven ground surfaces and thus exert a more uniform supporting force on the frame of the implement, independent of variations in the ground level.

These and other objects and advantages of my invention will become apparent after a consideration of the following description, reference being had to the drawings appended hereto, in which—

Figure 1 is a plan of the framework of a tractor mounted corn picker showing the outlines of the tractor in dotted lines;

Figure 2 is a side elevation showing the corn picker mounted on the tractor, the right rear wheel of the tractor being removed; and Figure 3 is a sectional elevation taken along a line 3—3 in Figure 1 showing the lateral bracing means for the auxiliary wheel.

Referring now to the drawings, reference numeral 5 indicates a tractor of the tricycle type which comprises generally a body or frame 6 including a transversely extending rear axle housing 7 in which is journaled a pair of laterally spaced rear traction wheels 8. The fore part of the frame 6 is carried on a pair of dirigible wheels 9. The implement, indicated generally by the reference numeral 10, is shown as a two-row tractor mounted corn picker although it is understood that this type of implement is shown by way of example since the principles of my invention may be applied to other types of implements as well.

The implement comprises a structural frame 11 including a pair of laterally spaced sections 12, 13 extending longitudinally alongside of the tractor body on opposite sides, respectively, and connected together around the forward end of the tractor by U-shaped frame member 14. Each of the frame sections comprises a pair of longitudinal members 15, 16 extending over the rear axle housing 17 between the tractor body 6 and the traction wheel 8 and extending forwardly substantially midway of the tractor and then inclining forwardly and downwardly as at 17, to provide a support for gathering mechanism 18. The frame members 15, 16 are supported on depending legs 19, the lower ends of which are journaled on a transversely extending shaft 20 which is carried on a bracket 21 bolted to the forward side of the rear axle housing 7. The corn picker frame 11 is thus pivotally supported near its rear end on the tractor for vertical swinging movement about the transverse shaft 20 for the purpose of adjusting the gathering mechanism 18 vertically relative to the ground, as is well known to those skilled in the art. The forward end of the frame is adjustable by means described in the aforementioned applications and need not be repeated here since the characteristic with which this invention is more directly concerned, is that the frame is normally held rigid relative to the tractor when in adjusted position.

In order to relieve a portion of the weight of the implement from the supporting wheels of the tractor, a pair of additional or auxiliary supporting wheels 25, 26 are provided, as in the aforementioned applications. According to the present invention, however, to eliminate the necessity for the complications of the mechanism for steering the auxiliary wheels from the tractor steering mechanism, the auxiliary wheels 25, 26 are disposed toward the rear of the tractor sufficiently close to the axis of the traction wheels 8 to permit the steering of the tractor with the implement mounted thereon, by means of the dirigible wheels 9 while the auxiliary wheels 25, 26 are held with their axes substantially parallel to the axis of the traction wheels 8. With the auxiliary wheels disposed in this position, appreciably closer to the traction wheels 8 than to the dirigible wheels 9, I have found that the auxiliary wheels will follow the dirigible wheels on turns without excessive stresses being set up in wheels or the implement frame. To this end, therefore, the auxiliary wheels are disposed between the traction wheels 8 and in overlapping relation thereto. Each of the wheels 25, 26 is connected to the frame 11 of the implement by means of a draft member 27 comprising a pair of forwardly extending draft bars 28, 29, respectively, extending forwardly from opposite ends of the axle 30 of each of the auxiliary wheels. The forward ends of the draft bars 28, 29 converge to a single pivotal connection 31 with a depending lug 32 which is fastened to the lower side of the downwardly inclined portion 17 on the implement frame. By means of these draft members 27, the auxiliary wheels 25, 26 are connected for independent vertical movement relative to the implement frame 11. By extending the draft members 27 forwardly to a pivotal connection with the forward part of the implement frame, I found that it is possible to reduce the size and weight of these members below that required for the push bar members shown in the aforementioned applications without sacrificing strength and durablity. The reduction of weight in these members is important for it increases the responsiveness of the auxiliary wheels to sudden changes in ground level during advance of the implement and so tends to maintain a more constant upward thrust against the frame.

The weight of the implement is transmitted to the auxiliary supporting wheels by a pair of upwardly extending serially connected link members 35, 36 pivotally connected together by a transversely extending shaft 37 and pivotally connected at their upper and lower ends, respectively, by transversely extending shafts 38, 39 to the implement frame and to the draft member, respectively. The upper link member 35 comprises a channel member connected at opposite ends on the transverse shafts 37, 38. The upper shaft 38 is supported in upwardly extending bearing lugs 40 fixed to the horizontal frame members 15, 16, respectively. Additional support for the channel member 35 on the upper shaft 38 is provided by a strap 41 bolted to the channel member 35 and extending diagonally to a point of connection with the shaft 38 alongside of the channel member 35. The lower link 36 comprises a pair of laterally spaced angle members 45 connected at opposite ends of the pivot shaft 37 and extending downwardly and rearwardly on opposite sides of the auxiliary wheel. To the lower end of each of the members 45 is fixed, as by welding, a U-shaped bracket 46 which straddles the draft bar and is pivotally connected thereto by the pin 39.

The lower end of the upper link 35 is cut out, as at 47, to accommodate a connecting collar 48 on the shaft 37. To this collar 48 is connected the forward end of a rearwardly extending coil spring 49, the rear end of which is fastened to the depending frame legs 19 by a bolt 50 which engages a cross bar 51 which interconnects the legs 19. The tension of the spring 49, which is adjustable by means of a nut 52 on the bolt 50, is thus applied at the joint 37 between the toggle links 35, 36 tending to straighten out the links and thus exerting a downward force upon the wheel through the draft member 27 and reacting upwardly against the implement frame through the plates 40. By adjusting the nuts 52, the amount of weight carried by the auxiliary supporting wheels 25, 26 can be adjusted. In operation the wheels 25, 26 will follow the uneven surface of the ground independent of the tractor wheels 8, 9 to maintain a substantially constant upward thrust against the frame, and each of the wheels 25, 26, by the means described, is free to move vertically independently of the other.

In order to brace the auxiliary wheels against lateral movement especially during turns, a pair of laterally, inwardly extending links 55, 56 are provided. These links are provided at the outer ends thereof with hooked portions 57 which engage apertures in plates 58 which extend inwardly from the inner bars 29 of the draft members 27. The inner ends of the links 55, 56 are turned to provide forwardly extending bearing portions 59 which are inserted through apertures in a U-shaped supporting member 60 which is bolted to depending flanges 61 of the tractor frame 6. Thus the links 55, 56 brace the draft members 27 against lateral movement while permitting free independent vertical movement thereof.

I claim:

1. In combination, a supporting frame carried on a pair of laterally spaced traction wheels and at least one dirigible wheel spaced longitudinally therefrom, an attachment frame supported on said supporting frame in normally fixed relation thereto, an additional supporting wheel disposed on an axis of rotation parallel to but spaced longitudinally from the axis of said traction wheels, means connecting said additional wheel to one of said frames permitting vertical movement relative thereto, and means acting downwardly upon said additional wheel and reacting upwardly against one of said frames for determining the weight carried on said wheel, said additional wheel being disposed appreciably closer to the axis of said traction wheels than to the axis of said dirigible wheel to permit steering said supporting frame by means of said dirigible wheels.

2. In combination, a supporting frame carried on a pair of rear traction wheels and at least one dirigible wheel spaced forwardly of said traction wheels, an attachment frame supported on said supporting frame in normally fixed relation thereto, an additional supporting wheel disposed appreciably closer to said traction wheels than to said dirigible wheel, means for connecting said additional wheel to one of said frames for rotation about an axis maintained substantially parallel to the axis of said traction wheels, said connecting means providing for vertical movement of said additional wheel relative to said frames, and spring means acting downwardly upon said additional wheel and reacting upwardly against one of said frames for loading a portion of the weight thereof upon said additional wheel.

3. In combination, a supporting frame supported on laterally spaced rear traction wheels and at least one dirigible wheel spaced forwardly thereof, an attachment frame supported on said supporting frame and movable coadunatively therewith, an additional supporting wheel disposed in overlapping relation to said traction wheels on an axis of rotation substantially parallel to and spaced longitudinally from the axis of said traction wheels, means for connecting said additional wheel to one of said frames permitting vertical movement relative thereto, and means acting downwardly upon said additional wheel and reacting upwardly against one of said frames for loading a portion of the weight of the latter upon the wheel.

4. In combination, a supporting frame supported on laterally spaced traction wheels and at least one dirigible wheel spaced forwardly thereof, an attachment frame supported on said supporting frame and movable coadunatively therewith, a pair of auxiliary supporting wheels disposed between said rear traction wheels and in overlapping relation thereto, means for connecting each of said wheels to one of said frames, said means providing for independent vertical movement relative thereto, and spring means acting downwardly upon each of said auxiliary wheels and reacting upwardly against one of said frames.

5. In combination with a tractor having a transversely extending rear axle housing, a pair of rear traction wheels disposed at opposite ends of said housing, respectively, for supporting said tractor, and forwardly disposed dirigible supporting wheels, an implement frame supported on said tractor in normally fixed relation thereto, a pair of auxiliary supporting wheels disposed between said traction wheels in overlapping relation thereto, draft means on which said wheels are journaled, means for pivotally connecting said draft means to said implement frame for vertical swinging movement relative thereto, and spring means for loading a portion of the weight of said implement frame upon said auxiliary wheels.

6. In combination with a tractor supported on laterally spaced rear traction wheels and forwardly disposed dirigible wheels, an implement frame mounted on said tractor and normally rigid with respect thereto, an auxiliary supporting wheel for said implement frame disposed between said rear traction wheels and rotatable about an axis disposed appreciably closer to the axis of said traction wheels than to the axis of said dirigible wheels to permit steering of the tractor by said forward wheels, a draft member on which said auxiliary wheel is journaled, and means for pivotally connecting said draft member to said implement frame for vertical swinging movement relative thereto, and spring means for loading a portion of the weight of said implement frame on said auxiliary wheel.

7. In combination with a tractor supported on laterally spaced rear traction wheels and at least one forwardly disposed dirigible wheel, an implement frame mounted on said tractor and normally rigid with respect thereto, an auxiliary supporting wheel disposed between said rear traction wheels and spaced forwardly of the axis of the latter wheels in overlapping relation therewith, means for maintaining said auxiliary wheel on an axis of rotation substantially parallel to the axis of said traction wheels but permitting vertical movement of said auxiliary wheel relative to said implement frame, said means comprising a fore and aft extending draft member on which said wheel is mounted, and means for pivotally connecting said draft member to said implement frame for swinging movement in a longitudinal vertical plane, and spring means for loading a portion of the weight of said frame on said auxiliary wheel.

8. In combination with a tractor supported on laterally spaced rear traction wheels and at least one forwardly disposed dirigible wheel, an implement frame mounted on said tractor and normally fixed relative thereto, an auxiliary supporting wheel for said implement frame disposed intermediate said front and rear wheels, means connecting said auxiliary wheel to said implement frame for vertical movement relative thereto, said means comprising an axle on which said wheel is journaled, draft means connected to opposite ends of said axle and extending forwardly therefrom, and pivot means at the forward end of said draft means connecting the latter to said implement frame for swinging movement in a vertical plane, and spring means acting downwardly upon said draft means and reacting upwardly against said implement frame for loading a portion of the weight of the latter upon said wheel.

9. In combination with a tractor supported on laterally spaced rear traction wheels and at least one forwardly disposed dirigible wheel, an implement frame mounted on said tractor and normally fixed relative thereto, an auxiliary supporting wheel for said implement frame disposed intermediate said front and rear wheels, means connecting said auxiliary wheel to said implement frame for vertical movement relative thereto, said means comprising an axle on which said wheel is journaled, draft means connected to opposite ends of said axle and extending forwardly therefrom, pivot means at the forward end of said draft means connecting the latter to said implement frame for swinging movement in a vertical plane, link means extending upwardly from said draft means and connected to said implement frame, spring means acting through said link means to yieldingly force said wheel downwardly relative to said frame, and bracing means extending laterally from said draft means and swingably connected to said tractor for preventing lateral movement of said wheel relative thereto.

10. In combination with a tractor having a frame supported on laterally spaced rear traction wheels and at least one forwardly disposed dirigible wheel, an implement frame mounted on said tractor and normally fixed relative thereto, a pair of auxiliary supporting wheels disposed between said traction wheels forward of the axis of rotation of the latter but in overlapping relation thereto, a draft member extending forwardly from each of said auxiliary wheels and pivotally connected to said implement frame permitting independent vertical movement of each of said wheels relative to said frame, link means extending upwardly from each of said draft members and connected with said implement frame, spring means acting through said link means for exerting a force downwardly upon said wheels and reacting upwardly against said frame, and bracing means extending laterally inwardly from each of said draft means and swingably connected to said tractor frame to prevent lateral movement of said wheels relative thereto.

11. In combination with a tractor having a body supported on front and rear carrying wheels, a harvesting implement comprising a frame supported on said tractor body, said frame having a forwardly and downwardly projecting portion for supporting gathering mechanism, an auxiliary supporting wheel for said implement frame disposed intermediate of said front and rear tractor wheels, a draft member for said auxiliary wheel, said member extending forwardly therefrom and pivotally connected to said downwardly and forwardly extending frame portion permitting vertical movement of said wheel relative to said implement frame, means restraining said wheel from moving laterally relative to said frame, and means acting downwardly on said wheel and reacting upwardly against said frame for loading a portion of the weight of the latter upon said wheel.

12. In combination with a tractor having a body supported on front and rear carrying wheels, a harvesting implement comprising a frame supported on said tractor body, said frame having a forwardly and downwardly projecting portion for supporting gathering mechanism, an auxiliary supporting wheel for said implement frame disposed intermediate of said front and rear tractor wheels, a draft member for said auxiliary wheel, said member extending forwardly therefrom and pivotally connected to said downwardly and forwardly extending frame portion permitting vertical movement of said wheel relative to said implement frame, link means extending upwardly from each of said draft members and connected with said implement frame, spring means acting through said link means for exerting a force downwardly upon said wheels and reacting upwardly against said frame, and bracing means extending laterally inwardly from each of said draft means and swingably connected to said tractor frame to prevent lateral movement of said wheels relative thereto.

13. In combination, a supporting frame carried on front and rear supporting wheels, an attachment frame mounted on said supporting frame in normally fixed relation thereto, an auxiliary supporting wheel for said attachment frame disposed intermediate said front and rear wheels, a draft member for said auxiliary wheel, said member extending forwardly therefrom and pivotally connected at its forward end to said attachment frame permitting vertical swinging movement of said wheel about said pivot relative to said implement frame, and means acting downwardly upon said wheel and reacting upwardly against said attachment frame.

14. In combination, a supporting frame carried on front and rear supporting wheels, an attachment frame mounted on said supporting frame in normally fixed relation thereto, an auxiliary supporting wheel for said attachment frame disposed intermediate said front and rear wheels, a draft member for said auxiliary wheel, said member extending forwardly therefrom and pivotally connected at its forward end to said attachment frame permitting vertical swinging movement of said wheel about said pivot relative to said implement frame, means restraining said wheel from moving laterally relative to said frame, link means extending upwardly from said draft member and pivotally connected to said attachment frame, and spring means acting through said link means for forcing said wheel downwardly relative to said frame.

NORMAN F. ANDREWS.